April 13, 1926. Re. 16,321

E. C. HENDERSON

SUPPORT FOR MOTOR CYCLES, BICYCLES, ETC

Original Filed Jan. 7, 1924

INVENTOR
ELDON C. HENDERSON
BY ATTY.
Lincoln Johnson

Reissued Apr. 13, 1926. Re. 16,321

UNITED STATES PATENT OFFICE.

ELDON C. HENDERSON, OF SAN FRANCISCO, CALIFORNIA.

SUPPORT FOR MOTOR CYCLES, BICYCLES, ETC.

Original No. 1,539,115, dated May 26, 1925, Serial No. 684,768, filed January 7, 1924. Application for reissue filed December 26, 1925. Serial No. 77,847.

*To all whom it may concern:*

Be it known that I, ELDON C. HENDERSON, a citizen of the United States, and a resident of the city and county of San Francisco, State of California, have made a new and useful invention, to wit, Improvements in Supports for Motor Cycles, Bicycles, Etc.; and I do hereby declare the following to be a full, clear, concise, and exact description of the same.

This invention relates particularly to a support for holding motorcycles, bicycles and the like in a substantially perpendicular and stationary position.

An object of the invention is to provide a support which may be securely attached to the frame of a two-wheeled vehicle and which is provided with a common means for positioning said support in either the operative or inoperative positions.

A further object of the invention is to provide a leg, for supporting a two-wheeled vehicle in an upright, stationary position, which will be superior in point of simplicity, inexpensiveness of construction, positiveness of operation, facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings.

Figure 2:
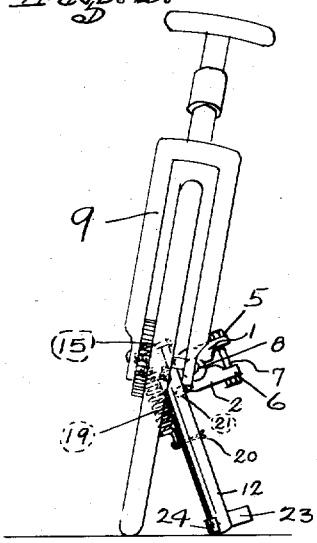
Fig. 2 is an end view of Fig. 1.
Figure 1:
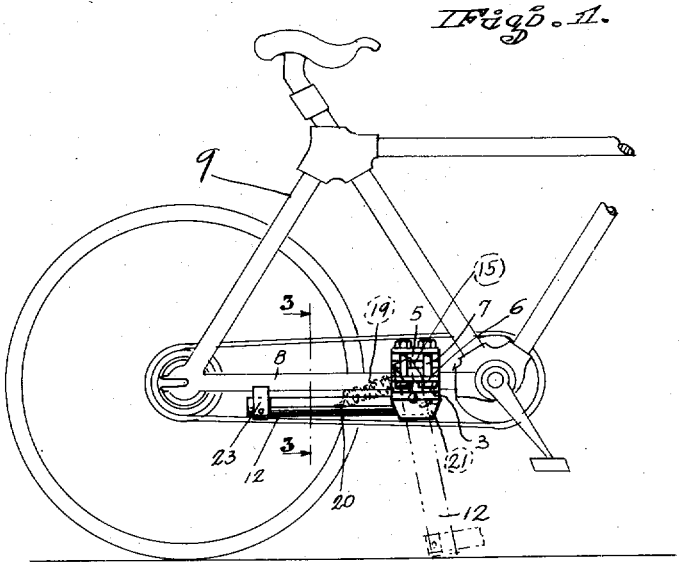
Fig. 1 represents a partial side elevation of a bicycle, having a support attached thereto constructed in accordance with my invention.
Figure 3:
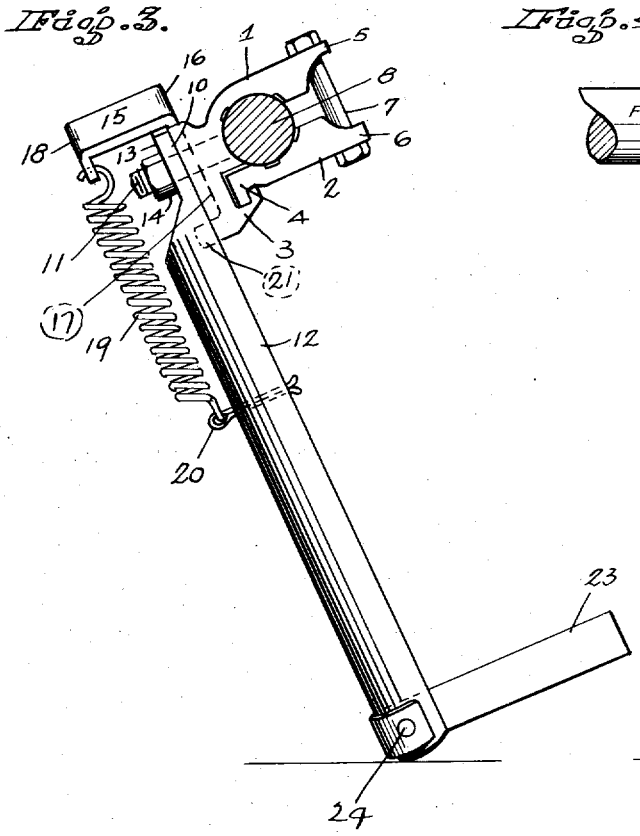
Fig. 3 is an enlarged cross-section taken through Fig. 1 on the line 3—3.
Figure 4:
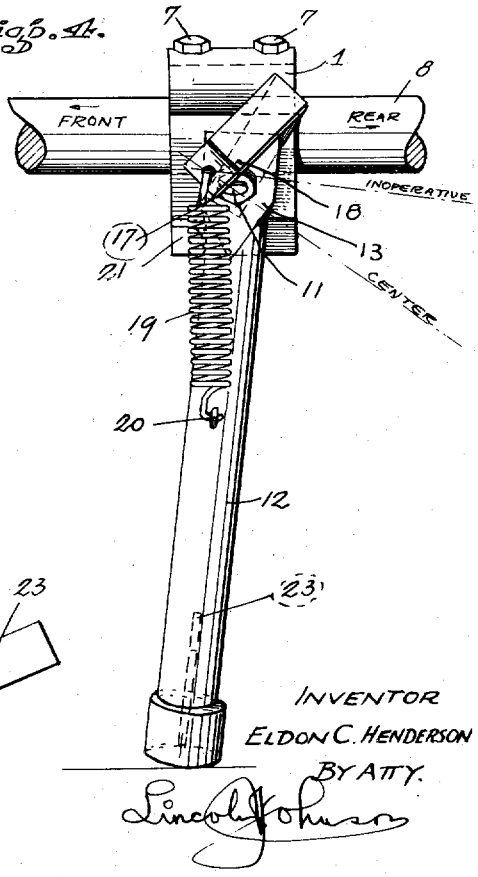
Fig. 4 is a bottom view of the under side of Fig. 3.

Motorcycles, bicycles, and the other two-wheeled vehicles are best supported in a stationary, upright position by means of a rack or stand secured to the frame of the said vehicle in an inconspicuous position on the frame when not in use, and in a usable position when it is desired to stand the vehicle upright. My invention relates to a simple form of support that may be secured to the vehicle frame in a manner easily accessible to movement in to and out of an operative position at an angle to the vertical by one foot of a person riding the said vehicle.

In detail the construction illustrated in the drawings comprises a clamp, formed of a pair of inter-locking, complementary members 1 and 2. The member 1 has a depression 3 therein to receive the lower edge 4 of the member 2 whereby the upper edges 5 and 6 of the said members 1 and 2 may be joined together by connecting bolts 7. The members 1 and 2 are adapted to be fixedly clamped around the frame 8 of the two-wheeled vehicle indicated by the numeral 9 in an angularly inclined position thereon relative to the vertical path of movement of the bicycle. The member 1 is provided with a planar surface 10 on one side thereof, from the face of which a threaded bolt 11 projects.

A supporting rack or leg 12, consisting of a length of suitable bar stock, particularly of pipe, has one end 13, flattened and drilled to pass over the bolt 11 to rest against the surface 10. A nut 14 is screwed on the bolt 11 and is adapted to hold the end of the bar 12 against the surface 10. The bar 12 is thus pivotally mounted on the member 1 and may be swung thereon within predetermined limits. The leg 12 is pivoted to the clamp so as to be swung outwardly and downwardly therefrom into a position inclined at an angle to the vertical path of movement of the bicycle. When the clamp is secured on the bicycle in a predetermined inclined position, the path of swinging movement prescribed by the leg is controlled, although it would be clearly within the purview of the invention to pivot the leg 12 to the bicycle independently of the clamp, so that the said leg could be placed in the desired angularly inclined operative position.

A rack 15 has an end 16 arranged in a recess 17 provided in the surface 10 and the opposite end 18 extends over and around the end of the leg 12. One end of a coil spring 19 is secured in the end 18, of the rack 15, and the opposite end of said coil spring is secured to a pin 20 extending through the support leg 12.

The end 18 of the rack 15 is arranged off-center in relation to the pivotal axis of the supporting leg 12 so that the spring 19 will be placed under tension when the support leg 12 is moved to either side of the "dead-center" position, formed where the axes of the support leg 12 and spring 19 coincide. The spring 19 is thus utilized for a dual purpose, that of holding the support leg 12 in an operative position for supporting the vehicle upright, and for holding the said support leg 12 in an inoperative position against the frame 8 of the vehicle.

When the clamp is mounted on the vehicle frame 8 with the support leg 12 thereon, the said leg 12 may be moved downwardly in a position inclined at an angle to that of the vehicle frame, so that the free end thereof will engage the surface on which the wheels of the vehicle rest, in which position the said vehicle will be supported. A stop 21 is provided on the surface 10 to engage the support leg 12 and limit the downward movement of said leg. The support leg would be held tightly against the stop 21 by the tension of the spring 19—which would be the operative position of said leg for holding the vehicle frame upright. When it would be desired to swing the support leg 12 in to the inoperative position, the operator would move to balance the vehicle on its wheels, and force the said support leg rearwardly over the "dead-center" until the spring 19 would pull the support leg 12 against the frame 8. A stirrup 23 is secured by a pin 29 on the free end of the support leg 12 to engage the frame 8 in the inoperative position and also to serve the purpose of providing a projection which might be engaged by the foot of the operator for moving the said support leg into and from the operative position. In the inoperative position the support leg 12 would lie substantially parallel to the frame 8, in constant readiness to be swung downwardly and outwardly into an operative position for supporting the vehicle substantially upright. My invention as illustrated and described is of a unit assembly and functions as such, and it is to be understood that a working combination of the same or equivalent parts in divided assembly is clearly contemplated as coming within the scope of my invention.

Having thus described this invention, what I claim and desire to secure by Letters Patent is:—

1. A device, such as described, comprising a clamp attachable in an angularly inclined position to the frame on one side of a bicycle; a single support arm pivotally attached to said clamp; a spring connected, at its opposite ends, to said clamp and arm; means on said clamp to limit the downward movement of said support arm and means on said arm to engage said bicycle frame to limit the upward movement of said arm.

2. A bicycle support, including a clamp, attachable in an angularly inclined position to the frame on one side of a bicycle; a single supporting arm pivoted to said clamp; a spring connected to said clamp and arm for holding said arm in an inoperative position against the bicycle frame and holding said arm in an operative position at an angle to said frame to support said bicycle on a substantially vertical plane; means on the clamp to engage said arm in the operative position; and means on the arm to engage the frame in the inoperative position.

3. A bicycle support including a clamp, attachable to the frame of a bicycle; a supporting arm pivoted to said clamp; a bracket mounted on said clamp; a spring connected at its opposite ends to said bracket and arm for holding said arm in an operative position against the bicycle frame and holding said arm in an operative position at an angle to said frame to support said bicycle on a substantially vertical plane; means on the clamp to engage said arm in the operative position; and means on the arm to engage the frame in the inoperative position.

4. A bicycle support, including a clamp, attachable in an angularly inclined position to the frame on one side of a bicycle; a single supporting arm pivoted to said clamp; a spring connected to said clamp and arm for holding said arm in an inoperative position against the bicycle frame and holding said arm in an operative position at an angle to said frame to support said bicycle on a substantially vertical plane; and means on said clamp and means on said arm to hold said arm in either the operative or inoperative positions.

5. A device, such as described, comprising a clamp mountable in an angularly inclined position on the frame of a bicycle; a single arm pivoted to said bracket; means on said clamp and means on said arm to limit the upward and downward movement of said arm; and a spring connected at its opposite ends to said clamp and arm to hold said arm in either an upward or downward position.

6. A leaning support for a two-wheeled vehicle comprised of a member attached to the frame of the vehicle; a single support arm pivoted to said member; a bracket on the frame to engage the arm in an operative angularly inclined position at an angle to the vehicle frame to support the vehicle frame in a substantially vertical position; means on the arm to support the arm in an inoperative position against the vehicle frame; and a spring to hold the arm in the operative and inoperative positions.

7. A leaning support for a two wheeled vehicle comprised of a clamp attachable to a stationary part of the vehicle; a single support arm pivotally attached to said clamp and adapted to swing into an angularly inclined position relative to the stationary part of the vehicle; a spring connected at its opposite ends to said arm and to the stationary part of the vehicle; means on the vehicle to limit the downward movement of the arm into the angularly inclined position; and means on the arm to engage the vehicle to limit the upward movement of the arm.

8. A bicycle support including a clamp attachable to the frame of a bicycle; a single support arm pivoted to said clamp; a bracket; a spring connected at its opposite ends to said bracket and arm to hold said arm in an inoperative position against the bicycle and an operative angularly inclined position at an angle to the bicycle to support the bicycle in a leaning position; and means on the bicycle to engage the arm in the operative and inoperative positions.

9. A bicycle support, including a clamp attached to the frame of a bicycle; a single support arm pivoted in an angularly inclined position on said clamp; a spring connected at its opposite ends to the bicycle and arm for holding said arm in an inoperative position against the bicycle frame and holding said arm in an operative position at an angle to the bicycle to support said bicycle in a leaning position; and means on the bicycle and means on the arm to hold said arm in either the operative or inoperative positions.

In testimony whereof, I have hereunto set my hand at the city and county of San Francisco, State of California, this 3rd day of December, 1925.

ELDON C. HENDERSON.